(12) United States Patent
Duffek et al.

(10) Patent No.: US 8,370,437 B2
(45) Date of Patent: Feb. 5, 2013

(54) METHOD AND APPARATUS TO ASSOCIATE A MODIFIABLE CRM RELATED TOKEN TO AN EMAIL

(75) Inventors: Daniel Norbert Duffek, Kirkland, WA (US); Dominic Justin Emile Joseph Pouzin, Sammamish, WA (US); Israel Hilerio, Kenmore, WA (US); Lyle Gordon Curry, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1209 days.

(21) Appl. No.: 11/021,452

(22) Filed: Dec. 23, 2004

(65) Prior Publication Data
US 2006/0155715 A1 Jul. 13, 2006

(51) Int. Cl.
G06F 15/16 (2006.01)
G06F 15/173 (2006.01)

(52) U.S. Cl. .......... 709/206; 709/224

(58) Field of Classification Search .......... 709/206, 709/207, 223, 224; 713/158; 726/2, 3, 9
See application file for complete search history.

(56) References Cited

U.S. PATENT DOCUMENTS

| | | | | |
|---|---|---|---|---|
| 6,360,254 B1* | 3/2002 | Linden et al. | ........ | 709/219 |
| 6,484,197 B1* | 11/2002 | Donohue | ........ | 709/206 |
| 6,523,041 B1* | 2/2003 | Morgan et al. | ........ | 1/1 |
| 6,968,364 B1* | 11/2005 | Wong et al. | ........ | 709/217 |
| 7,065,555 B2* | 6/2006 | Foulger et al. | ........ | 709/206 |
| 7,089,241 B1* | 8/2006 | Alspector et al. | ........ | 707/7 |
| 7,580,850 B2* | 8/2009 | Lurie | ........ | 705/7.26 |
| 8,037,193 B2* | 10/2011 | Hay et al. | ........ | 709/229 |
| 2002/0083140 A1* | 6/2002 | Shin et al. | ........ | 709/206 |
| 2002/0120692 A1* | 8/2002 | Schiavone et al. | ........ | 709/206 |
| 2002/0152126 A1* | 10/2002 | Lieu et al. | ........ | 705/26 |
| 2003/0158960 A1* | 8/2003 | Engberg | ........ | 709/237 |
| 2003/0200272 A1* | 10/2003 | Campise et al. | ........ | 709/206 |

OTHER PUBLICATIONS

Winer, R.S., "Customer Relationship Management; A Framework, Research Directions, and the Future", Hass SChool of Business, UNiversity of Califormia at Berkley; 2001. [retrieved from the Internet="http://www.thetawer.com/wiki/images/4/43/B._Customer_Relationship_Management_A_Framework.pdf" on Sep. 1, 2009].*

* cited by examiner

*Primary Examiner* — Saleh Najjar
*Assistant Examiner* — Lashanya Nash

(57) ABSTRACT

A method and apparatus to associate incoming emails to a customer relationship management (CRM) object is disclosed. The method may include creating a user configurable tracking token that relates an email to a CRM object, attaching the tracking token to an outgoing email, sending the outgoing email to recipients, receiving an incoming email, determining whether the incoming email has a tracking token and if the incoming email has a tracking token, associating the incoming email with the matching CRM object.

20 Claims, 5 Drawing Sheets

| Name | Default | Range | Configurable | |
|---|---|---|---|---|
| Token Prefix | CRM: | String | Yes. This can be set to a company defined string. It probably shouldn't be greater than 20 characters, ideally only 5. | |
| Creation Descriptor | 1 digit (0 or 1) | 0 for Online<br>1 for Offline | No. | |
| Email Tracking Id | 3 digits | 0 to 999 | Yes. This can be set to a company defined int. | |
| Tracking Token Number | 4 digits | 0 to 9999. If 0 is specified the Tracking Token will be turned off. | Yes. This can be set to a company defined int. | |

Using this nomenclature, one example of Tracking Tokens could be:
- REF:0 111 1234
- REF: is the Tracking Token Prefix
- 0 signifies the email was created Online
- 111 is the Email Tracking id of the user
- 1234 is the Tracking Token Number for user 111

FIG. 4

METHOD AND APPARATUS TO ASSOCIATE A MODIFIABLE CRM RELATED TOKEN TO AN EMAIL

BACKGROUND

Customer relationship management systems (CRM) attempt to assist users keep useful information on current clients, potential clients and other contacts. Users can store data that may be useful in servicing current clients and in obtaining new clients. In addition, tasks, sometimes in the form of objects, can be associated with clients. For example, an email, which may be an object, may be sent to certain clients. The email may related to an object such as an account. If a client responds to the email, the related account most likely will not be displayed when the sender opens the reply. In order to see the related account, the sender would have to manually locate the related account.

SUMMARY

A method and apparatus to associate incoming emails to a customer relationship management (CRM) object is disclosed. The method may include creating a user configurable tracking token that relates an email to a CRM object, attaching the tracking token to an outgoing email, sending the outgoing email to recipients, receiving an incoming email, determining whether the incoming email has a tracking token and if the incoming email has a tracking token, associating the incoming email with the matching CRM object. The tracking token may further include an indication of whether the outgoing email was created one of offline and online, an indication of a user ID of a sender of the outgoing email and an indication of the number of outgoing emails sent. The tracking token may be an indication in an email subject line. The method may also include monitoring whether a user has sent a maximum number of emails and allowing the maximum number of emails to be reset. The tracking token may further include an indication of a CRM company deployment. The method may also include combining a token prefix, a creation descriptor, an email tracking id and a tracking token number to create the tracking token. The method may also include allowing the user to configure at least one of a token prefix, an email tracking id and a tracking token number. A computer readable medium that may have computer executable instructions for performing the above described method is disclosed. Finally, a computing apparatus that may include a processing apparatus where the processing apparatus may be programmed to execute the above described method is disclosed.

DRAWINGS

FIG. 4 is an illustration of an example of the data used to create of a tracking token.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
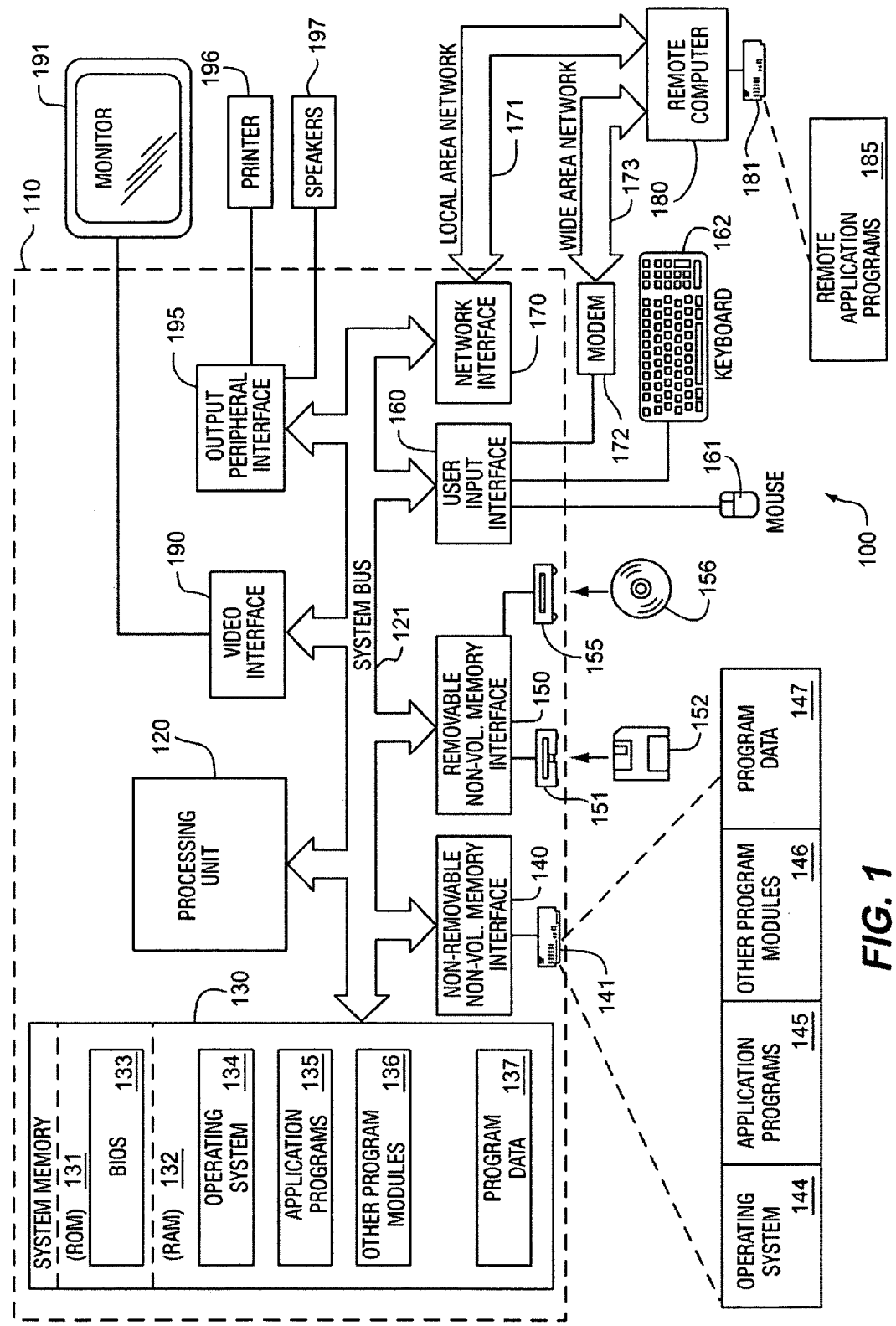
FIG. 1 is a block diagram of a computing system that may operate in accordance with the claims.

FIG. 1 illustrates an example of a suitable computing system environment 100 on which a system for the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
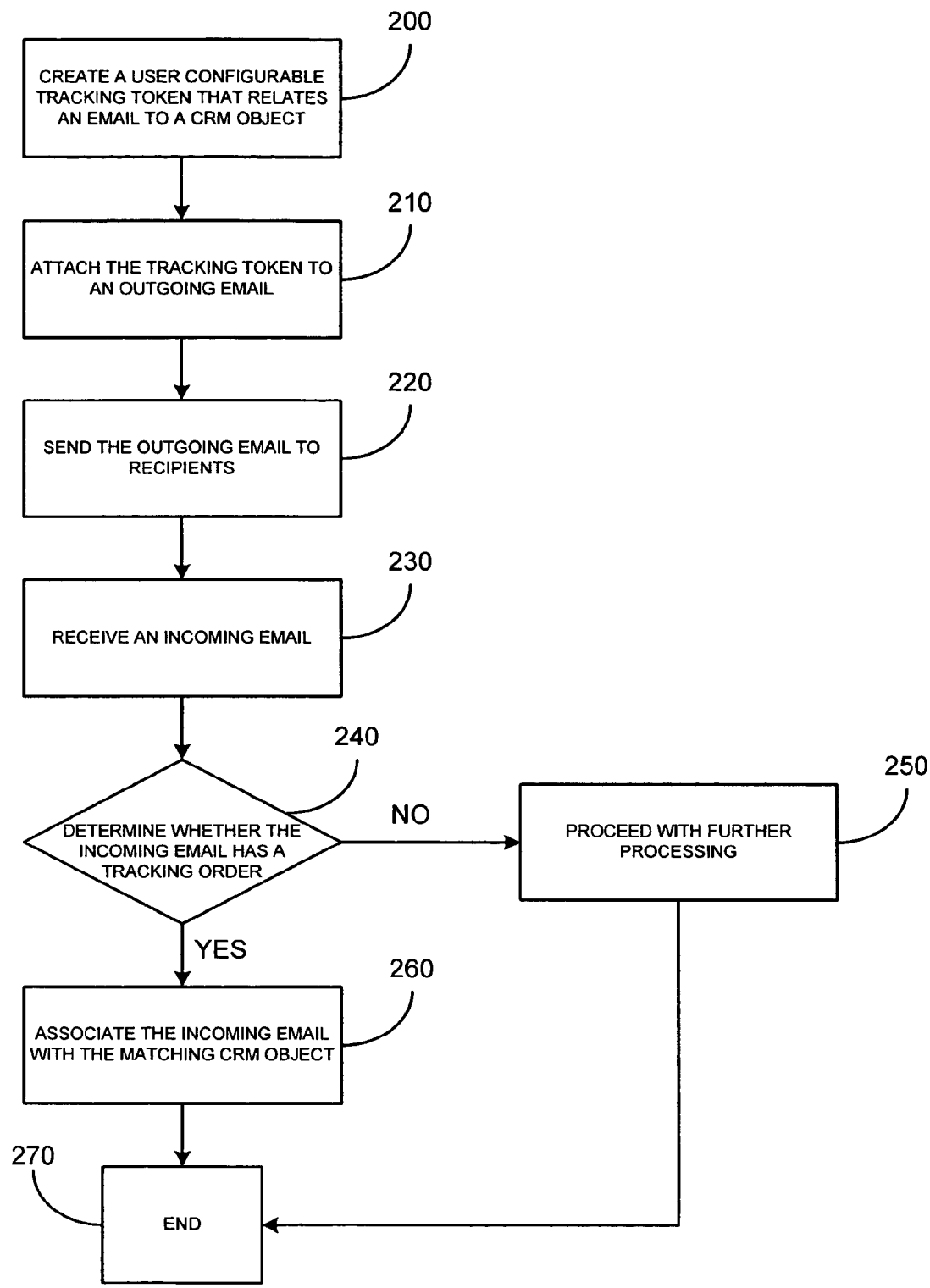
FIG. 2 is an illustration of a block diagram of a method in accordance with the claims.

FIG. 2 may be an illustration of a method to associate incoming emails to a customer relationship management (CRM) object. While the following description focuses on email, tracking tokens can be attached to virtually any action in a CRM system. For example, facsimiles, traditional mail, telephone calls, bank wires, checks, etc., all may be assigned tracking tokens and may take advantage of the apparatus and method described in the claims. At block 200, a user configurable tracking token may be created that relates an email object to a CRM object. There are a variety of ways to create the token to relate an email to a CRM object. One way is to include the token in the subject line of an email as it is rare for a subject line to be modified in a return email. The token may be stored in other places in the email as well, such as in the body of the email or the email header but this may be less desirable as some email systems modify the body or header when returning an email.

FIG. 4 may be an illustration of the type of information that may be contained within a token. The tokens may be designed to attempt to avoid having replicate tokens. For example, if a replicate token was created, when the token returned to the CRM system, the CRM system would have two matches for the token and the CRM system would have to guess as to which of the two matches the tracking token relates. Accordingly, the token may be made of a variety of elements, which combined, that make a tracking token that is less likely to be duplicated, thereby avoid collision type problems. In addition, previously used tracking tokens may be stored and new tracking tokens may be checked to ensure that the new tokens are not duplicates of previously used tracking tokens. Further, by allowing users to customize the tokens, the probability of duplicate tokens being created may be reduced.

It may be possible for a token to be reused such as when someone takes a very long time (months, maybe years) to respond to an email with a tracking token and in the mean time, the tracking token may have been reused. In these instances, the returned token may be matched with the most recent email related to that token or other rules may be applied to determine how to properly administer the email.

A token may have a prefix 415. The default value of this prefix 415 may be CRM, for example. The range of the data in the prefix may be any string characters 430 and the token prefix may be configurable 440 by the user. For example, a string usually should not be longer than 20 characters and may be five characters.

The token may also include a creation descriptor 445. The creation descriptor may be a single digit 450 and the creation descriptor may indicate whether an email was sent online or offline. For example, a zero may indicate the email was sent offline and a one may indicate that the was sent online.

The token may also include an email tracking id 460. The tracking id may be three digits long 465 and it may be, for example, of the range from 0 to 999 (element 470) and the email tracking id 460 may indicate the sender of the email. The email tracking id may be defined by the user 475. For example, it may be desirable to have the email tracking id match the last three digits of a sender's telephone extension. Accordingly, if a sender was at telephone extension 561, the sender's email tracking id 460 may also be 561. On the other hand, the email tracking ids 460 may be assigned sequentially where the first user would be assigned number 0, the second user assigned number 1, etc. In yet another example, the email tracking ids 460 may relate to the hierarchy of the company where the president may have number 0, the vice president may have number 1, etc. In addition, the number of digits used may be varied. For a system that has hundreds of users and a high email volume, more digits may be necessary to make token repeats or collisions less likely. For a system with a few users and less email volume, fewer digits may be required.

In addition, the tracking token may have a tracking token number 480. The tracking token number may be four digits long 485, such as from 0 to 9999 as indicated by element 490. In addition, the tracking token number 480 may be modifiable by the company 495. The tracking token number 480 may increase incrementally. The tracking token number 480 may be a way to ensure that a particular sender has not exceeded a maximum limit of emails. In addition, by limiting the number of emails a user can send, certain computer viruses may be limited in the damage they create by limiting the number of emails that a user may be able to send.

The tracking token may be modifiable at set-up, at the launch of each CRM session, or when an email is sent. In addition, tracking tokens of a first form may be stored and used as the default for a first client and tracking tokens of a second form may be stored and used as the default for a second client. By saving the various tracking tokens in an email activity table or database, the fact that the tracking tokens may be modified will not confuse the system because the actual modified sent token will be stored and used to match any returning tracking tokens.

Referring again back to FIG. 2, at block 210, the tracking token may be attached to an outgoing email. As previously stated, the tracking token may be included in the subject line of the outgoing email. In addition, the token may be attached to the sent email in any manner. The tracking token may be stored in an email activity table or database as there may be other relevant information about the email such as the message id, the recipients, etc. This may be important as the tracking token is user configurable so the tracking token can have a virtually limitless number of forms. At block 220, the outgoing email may be sent to recipients. This may be executed in any traditional manner of sending email. At block 230, an incoming email may be received. Again, emails may be received in any traditional manner.

At block 240, a determination may be made whether the incoming mail has a tracking token. For example, an email system may review all incoming emails for the token prefix or a token tracking number or any other indication that a token is included in the incoming email. If a tracking token is not located, at block 250 the email may be further processed. For example, the email may be further review to determine if it is unsolicited or if it has other indications that may be useful in better handling the email. If it is determined at block 240 that a tracking token is included, at block 260, the incoming email may be associated with the matching CRM object or a plurality of objects. At block 270, the method may end.

Referring again back to block 260, there are a variety of ways of associating the incoming email with the matching CRM object, depending on the object is. For example, if the incoming emails is from a particular client, contact information for that client may be displayed along with the incoming email. As yet another example, if the incoming email is a response to a proposal sent to a client, that proposal may be the associated object and may be retrieved along with the incoming email and displayed to the relevant party. In addition, the tracking token may have an indication of a particular CRM deployment within a company. Large companies may have multiple deployments of CRM systems. Duplication of certain token indications may be possible, but by indicating which CRM deployment is being used by the token, the incoming emails can be sorted by CRM deployment and properly sent to the relevant parties.

Figure 3:
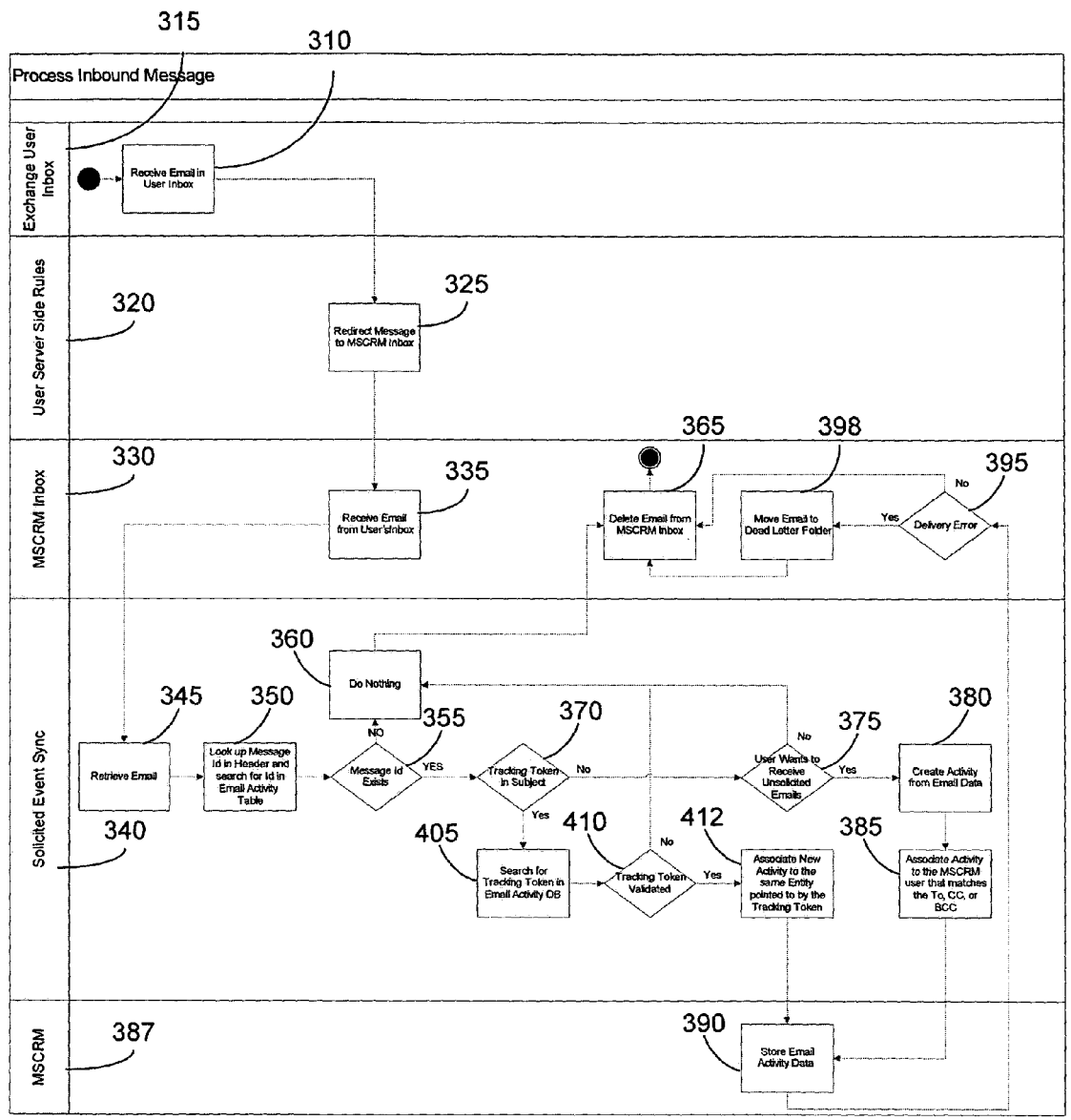
FIG. 3 is an illustration of a diagram of a method of receiving an incoming email in accordance with the claims.

FIG. 3 may illustrate a further example of receiving email with a tracking token. At block 310, an email may be received in a user's inbox. This may be through Microsoft Exchange, for example, element 315. In the user's server side rules 320, the message may be redirected 325 to the Microsoft CRM inbox for this CRM deployment. Of course, client side rules could also be used as could any other mechanism that forwards emails. Once an email is in the CRM inbox 330, the email may be synchronized by the solicited event synch block 340. At block 345, the email may be retrieved from the CRM inbox 330. At block 350, the message id may be reviewed in the header and this message id may be searched in an email activity table inside the CRM system. The email activity table may store the message id and other information for all emails sent or received by the CRM system. For example, when an email is sent, an email message id may be created and it may be stored in an email activity table. If a response to the sent email has the sent message id as part of its data, this message id may be used to search the email activity table.

At block 355, a determination may be made whether the message id exists in the email activity table. If an id does not exist, then the system may do nothing (element 360) and the email may be deleted from the Microsoft CRM inbox 365. If a message id does exist, control may pass to block 370 where a determination may be made whether a tracking token is in the subject of the email. If there is not a tracking token in the subject of the email, control may pass to block 375 where another determination may be made whether the user desires to receive unsolicited emails. If the user does not desire to receive unsolicited emails, control may pass to block 360 or nothing may be done by the system, and the email may be deleted from the Microsoft CRM inbox at block 365. If the user does desire to receive unsolicited emails, an activity may be created based on the email data at block 380 and activity may be associated to the Microsoft CRM user that matches the to:, cc: or bcc: line 385. Then, the email activity may be stored in the database 390. After the email is stored at block 390, block 395 may determine whether the email delivery to the MSCRM inbox 330 was successful. If delivery was successful, the email may be moved to the dead letter folder 398. If there was not a delivery error, the email may be deleted from the Microsoft CRM inbox at block 365.

Referring again back to block 370, if the tracking token is in the subject, then control may pass to block 405 where the system may search for a tracking token in the email activity database. A decision may be made at block 410 to determine whether the tracking token is validated. If the tracking token is not validated, control may pass to block 360 where the system may do nothing and the email may be deleted at block 365 from the Microsoft CRM inbox. If the tracking token is validated, control may pass to block 412 where a new activity may be associated to the same entity pointed to by the tracking token.

As the tracking tokens may take some time to return to the sender and activity in the CRM system may continue during the time from when the tracking token is sent to when the tracking token returns (and a possible duplicate tracking token may be created), there may be a variety of strategies to match the tracking token with CRM activity. One strategy would be to match the tracking token to the most recent CRM activity for the given tracking token. For example, an email with a tracking token may be sent to certain customers that two items are being closed-out. In time, one of the close-out items may sell out and a follow-up email may be sent indicating that one item has sold-out. By the time an email returns with the original return tracking token, one of the two close-out items may be totally sold out. As another example, a first email with a tracking token may be sent to customers announcing a new product. Years may pass and second email may be sent that coincidentally has the same tracking token. The receiver of the years old first email may respond. The system may then pull up the most recent email indicating that one of the items is sold-out. Another strategy would be to pull up the original email and any follow-up correspondence related to that email. Yet a further strategy would be to solely pull up the original email in question. Obviously, a variety of matching strategies are possible. In addition, tokens with a variety of configurations including tokens from previous versions of CRM systems and even other CRM systems may be processed.

From block 412, control may pass to block 390 where the email activity data may be stored in the Microsoft CRM system 387, and control may then pass to block 395 where a determination may be made whether a delivery error has occurred. If there was no delivery error, the email may be deleted from the Microsoft CRM inbox at block 365. If there was a delivery error, the email may be moved to the dead letter folder 398 where it may be further reviewed, for example, to determine a cause of the delivery error, and eventually the item may be deleted from the MSCRM in-box 365.

Figure 5:
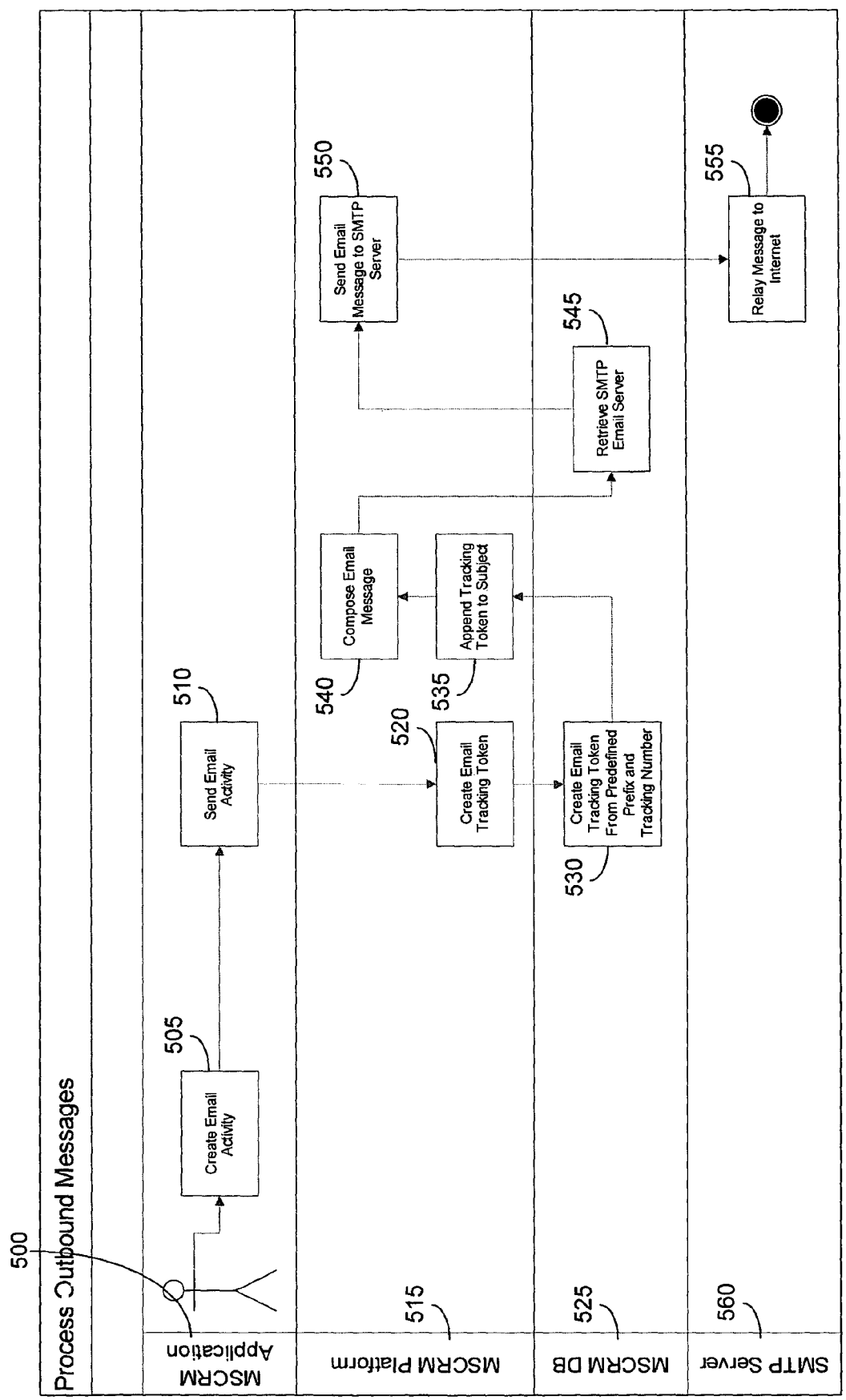
FIG. 5 is an illustration of a diagram of a method of creating an outgoing email in accordance with the claims.

FIG. 5 may be an illustration of how an outbound message may be processed. At block 505, a user may create an email activity in the MSCRM application. At block 510, the MSCRM Application may begin to send the email. The Microsoft CRM platform 515 may then create an email tracking token 520. The token may not be created in advance but may be created at the time of sending the email. The Microsoft CRM database 525 may then create an email tracking token from a predefined prefix and tracking numbers 530. The prefix may be created as described in reference to FIG. 4, such as having a token prefix 415, a creation descriptor 445, an email tracking id 460 and a tracking token number 480. The tracking token may be user configurable as described in reference to FIG. 4. The tracking token number 480 and other relevant information about the email may be stored in a CRM email activity table or database such that when a return email is received with a tracking token, it can be compare to the tracking tokens stored in the CRM email activity table or database in order to locate the relevant CRM object or objects.

In the Microsoft CRM platform 515, the tracking token created in block 530 may be appended to the email 535, and at block 540, the email may be composed in its final form, including the tracking token in the subject line. At block 545, the Microsoft CRM database may retrieve the simple mail transfer protocol email server, and at block 550, the email may be sent to the simple mail transfer protocol (SMTP) server in the MSCRM platform 515. At block 555 the message may be relayed to the internet using a simple mail transfer protocol server 560.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method to associate incoming emails to a customer relationship management (CRM) object from a CRM application comprising:

at a sending computing system, in the CRM application, creating a tracking token having a user configurable format that, when attached to an email, relates the email to a CRM object wherein creating the user configurable token further comprises:
combining a token prefix, a creation descriptor, an email tracking ID and a tracking token number to create the tracking token;
selecting a default token format based on a client;
allowing the default token format based on the client to be modified;
when the default token format based on the client is modified, replacing the default token format based on the client with the format as modified;
storing the tracking token in a memory on the sending computing system along with previously created tracking tokens;
attaching the tracking token to an email subject line of an outgoing email in the CRM application;
sending the outgoing email to recipients from the CRM application;
receiving an incoming email at the sending computing system at an email application;
looking up a message ID in a header of the incoming email and searching for the message ID an email activity store comprising at least one of a table and a database, stored in the memory;
determining whether the incoming email has an attached tracking token at the CRM application, when the message ID is found in the email activity store;
when the incoming email has an attached tracking token,
determining if the attached tracking token was created by the sending computing system by comparing the attached tracking token to the tracking token stored in the email activity store; and
when the attached tracking token was determined to be created by the CRM application on the sending computing system,
associating the incoming email with the matching CRM object located according to the tracking token in the email activity store created by the CRM application on the sending computing system and
executing a CRM based action in the CRM application related to the CRM object on the sending computing device wherein the CRM action is at least one selected from a group comprising:
opening related client contact information;
opening a related proposal;
opening related emails;
opening follow on related communications;
opening the proper CRM deployment; and
opening a most recent CRM activity related to the token.

2. The method of claim 1, wherein the tracking token further comprises an indication of whether the outgoing email was created one of offline and online.

3. The method of claim 1, wherein the tracking token further comprises an indication of a user ID of a sender of the outgoing email.

4. The method of claim 1, wherein the tracking token further comprises an indication of the number of outgoing emails sent.

5. The method of claim 1, wherein the tracking token further comprises an indication in an email subject line.

6. The method of claim 1, further comprising combining a token prefix, a creation descriptor, an email tracking id and a tracking token number to create the tracking token.

7. The method of claim 1, further comprising allowing the user to configure at least one of a token prefix, an email tracking id and a tracking token number.

8. A non-transitory computer storage medium having computer executable instructions for performing a method to associate incoming emails to a customer relationship management (CRM) object from a CRM application comprising:
at a sending computing system, in the CRM application, creating a tracking token having a user configurable format that relates an email to a CRM object wherein creating the user configurable token further comprises:
combining a token prefix, a creation descriptor, an email tracking ID and a tracking token number to create the tracking token;
selecting a default token format based on a client;
allowing the default token format based on the client to be modified;
when the default token format based on the client is modified, replacing the default token format based on the client with the format as modified;
storing the tracking token in a memory on the sending computing system along with previously created tracking tokens;
attaching the tracking token to an email subject line of an outgoing email in the CRM application;
sending the outgoing email to recipients from the CRM application;
receiving an incoming email at the sending computing system with an email application;
looking up a message ID in a header of the incoming email and searching for the message ID an email activity store comprising at least one of a table and a database, stored in the memory;
determining whether the incoming email has an attached tracking token at the CRM application, when the message ID is found in the email activity store;
when the incoming email has a tracking token,
determining if the attached tracking token was created by the sending computing system by comparing the attached tracking token to the tracking token stored in the email activity store; and
when the attached tracking token was determined to be created by the CRM application on sending computing system,
associating the incoming email with the matching CRM object located according to the tracking token in the email activity store created by the CRM application on the sending computing system; and
executing a CRM based action in the CRM application related to the CRM object on the sending computing device wherein the CRM action is at least one selected from a group comprising:
opening related client contact information;
opening a related proposal;
opening related emails;
opening follow on related communications;
opening the proper CRM deployment; and
opening a most recent CRM activity related to the token.

9. The non-transitory computer storage claim of claim 8, wherein the tracking token further comprises an indication of whether the outgoing email was created one of offline and online.

10. The non-transitory computer storage claim of claim 8, wherein the tracking token further comprises an indication of a user ID of a sender of the outgoing email.

11. The non-transitory computer storage claim of claim 8, wherein the tracking token further comprises an indication of the number of outgoing emails sent.

12. The non-transitory computer storage claim of claim 8, wherein the tracking token further comprises an indication in an email subject line.

13. The non-transitory computer storage claim of claim 8, further comprising computer executable instructions for combining a token prefix, a creation descriptor, an email tracking id and a tracking token number to create the tracking token.

14. The non-transitory computer storage claim of claim 8, further comprising computer executable instructions for allowing the user to configure at least one of a token prefix, an email tracking id and a tracking token number.

15. A computing apparatus, comprising:
  a display unit that is capable of generating video images;
  an input device;
  a processing apparatus operatively coupled to said display unit and said input device, said processing apparatus comprising a processor and a memory operatively coupled to said processor,
  a network interface connected to a network and to the processing apparatus;
  said processing apparatus being programmed to associate incoming emails to a customer relationship management (CRM) object from a CRM application;
  said processing apparatus being programmed to create, at a sending computing system, in the CRM application, a tracking token having a user configurable format that relates an email to a CRM object wherein creating the user configurable token further comprises:
  combining a token prefix, a creation descriptor, an email tracking ID and a tracking token number to create the tracking token;
  selecting a default token format based on a client
  allowing the default token format based on the client to be modified
  when the default token format based on the client is modified, replacing the default token format based on the client with the format as modified;
    storing the tracking token in a memory on the sending computing system;
    said processing apparatus being programmed to attach the tracking token to an email subject line of an outgoing email in the CRM application;
    said processing apparatus being programmed to send the outgoing email to recipients from the CRM application;
    said processing apparatus being programmed to receive an incoming email at the sending computing system with an email application;
  said processing apparatus being programmed to look up a message ID in a header of the incoming email and search for the message ID an email activity store comprising at least one of a table and a database, stored in the memory;
  said processing apparatus being programmed to determine whether the incoming email has an attached tracking token at the CRM application, when the message ID is found in the email activity store; and
  when the incoming email has a tracking token,
    determining if the tracking token was created by the sending computing system by comparing the attached tracking token to the tracking token stored in the email activity store; and
  when the attached tracking token was determined to be created by the CRM application on the sending computing system, said processing apparatus being programmed to:
    associate the incoming email with the matching CRM object located according to the tracking token in the email activity store created by the CRM application on the sending computing system and
    executing a CRM based action in the CRM application related to the CRM object on the sending computing device wherein the CRM action is at least one selected from a group comprising:
      opening related client contact information;
      opening a related proposal;
      opening related emails;
      opening follow on related communications;
      opening the proper CRM deployment; and
      opening a most recent CRM activity related to the token.

16. The computing apparatus of claim 15, further comprising said processing apparatus being programmed to monitor whether a user has sent a maximum number of emails.

17. The computing apparatus of claim 16, further comprising said processing apparatus being programmed to allow the maximum number of emails to be reset.

18. The computing apparatus of claim 15, wherein the tracking token further comprises an indication of a CRM company deployment.

19. The computing apparatus of claim 15, further comprising said processing apparatus being programmed to check the tracking tokens to be attached to ensure they are not duplicates of previously used tracking tokens.

20. The computing apparatus of claim 15, further comprising said processing apparatus being programmed to match the incoming tracking token to the most recent CRM object associated with the tracking token.

* * * * *